United States Patent Office 3,754,000
Patented Aug. 21, 1973

3,754,000
DERIVATIVES OF 3-AMINOCARBONYL-2-OXAZOLIDINONE AND THEIR PROCESS OF PREPARATION
Claude P. Fauran and Colette A. Douzon, Paris, Gerard J. Huguet, Malesherbes, Guy M. Raynaud, Paris, and Claude J. Gouret, Meudon, France, assignors to Delalande S.A., Courbevoie, France
No Drawing. Filed Mar. 22, 1971, Ser. No. 127,049
Claims priority, application France, Mar. 24, 1970, 7010453; Feb. 17, 1971, 7105295
Int. Cl. C07d 85/28
U.S. Cl. 260—307 C          3 Claims

ABSTRACT OF THE DISCLOSURE

A compound of the formula

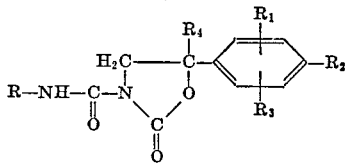

in which $R_4$ is H or phenyl
R is phenyl, alkyl or alkenyl having 1–4 C or a cycloaliphatic having 5 or 6 C
$R_1$, $R_2$ and $R_3$ is hydrogen methyl or halogen, The compound is formed by reacting an isocyanate

with an oxazolidinone.

The compounds possess anticonvulsive myorelaxant, antidepressive, antiinflammatory, anxiolylic and analgesic properties.

---

The present invention concerns novel derivatives of 3-aminocarbonyl-2-oxazolidinone, their process of preparation and their therapeutic application.

The novel compounds according to the invention correspond to the general formula:

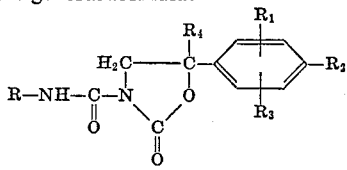

in which:

$R_4$ is either a hydrogen atom or a phenyl radical;
R represents a phenyl radical, an alkyl or alkenyl radical having 1 to 4 carbon atoms or a cycloaliphatic radical having 5 or 6 carbon atoms,
the radicals $R_1$, $R_2$, and $R_3$ represent hydrogen a methyl radical or a halogen atom.

The process according to the invention consists in reacting an isocyanate of the formula:

in which R has the same significance as in Formula I, with an oxazolidinone of the formula:

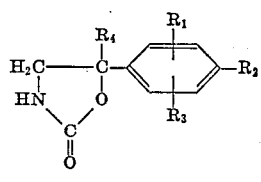

in which $R_4$, $R_1$, $R_2$ and $R_3$ have the same significance as in Formula I.

The following preparations are given by way of non-limitative examples to illustrate the invention.

EXAMPLE I 3-(n-propylaminocarbonyl)-5-phenyl-2-oxazolidinone
(Code No. 6913)

43 g. of 5-phenyl-2-oxazolidinone and 100 ml. of propyl isocyanate are introduced into a reaction vessel under pressure. The mixture is heated with agitation for 1 hour at 140° C. After cooling, the product obtained is dissolved in 150 ml. of absolute ethanol and the mixture is boiled for 1 hour. After removal of the alcohol, an oily residue is obtained which is purified by distillation. The propylurethane layer (boiling point=80° C. under 2 mm. Hg) is removed and the desired product is then recovered.

Boiling point: 180° C. under 0.04 mm. Hg
Melting point: 30° C.
Yield: 90%
Empirical formula: $C_{13}H_{16}N_2O_3$

*Elementary analysis.*—Calculated (percent): C, 62.89; H, 6.50; N, 11.28. Found (percent): C, 63.07; H, 6.48; N, 11.08.

EXAMPLE II 3-(cyclohexylaminocarbonyl)-5-phenyl-2-oxazolidinone
(Code No. 69270)

43 g. of 5-phenyl-2-oxazolidinone and 50 ml. of cyclohexyl isocyanate are introduced into a reaction vessel under pressure, and the mixture is heated for 1 hour at 150° C. After cooling, the product obtained is treated with 250 ml. of ethanol and warmed for 1 hour. After evaporation of the alcohol, the cyclohexyl urethane is removed by distillation under reduced pressure. The residue is crystallised in 95° alcohol.

Melting point: 68° C.
Yield: 75%
Empirical formula: $C_{16}H_{20}N_2O_3$

*Elementary analysis.*—Calculated (percent): C, 66.64; H, 6.99; N, 9.72. Found (percent): C, 66.67; H, 7.13; N, 9.88.

EXAMPLE III 3-(n-propylaminocarbonyl)-5,5-diphenyl-2-oxazolidinone (Code No. 69271)

60 g. of 5,5-diphenyl-2-oxazolidinone and 60 ml. of propyl isocyanate are introduced into a reaction vessel under pressure. The mixture is heated at 170° C. with agitation for 1 hour. After cooling, the product obtained is treated with 200 ml. of ethanol with heating. The product crystallises and is purified by recrystallisation in 96° alcohol.

Melting point: 89° C.
Yield: 74%
Empirical formula: $C_{19}H_{20}N_2O_3$

*Elementary analysis.*—Calculated (percent): C, 70.35; H, 6.22; N, 8.64. Found (percent): C, 70.15; H, 6.16; N, 8.73.

The compounds listed in the following Tables I, II and III have been prepared in accordance with the invention.

TABLE I

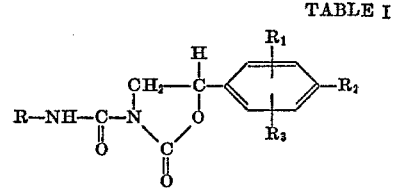

[R₁=R₂=R₃=H]

| Code number | R | Empirical formula | Molecular weight | Yield (percent) | Melting point (°C.) | Calculated C | Calculated H | Calculated N | Found C | Found H | Found N |
|---|---|---|---|---|---|---|---|---|---|---|---|
| 68325 | $C_6H_5-$ | $C_{16}H_{14}N_2O_3$ | 282.29 | 93 | 160 | 68.07 | 5.00 | 9.92 | 68.23 | 4.80 | 10.11 |
| 69255 | $CH_3-$ | $C_{11}H_{12}N_2O_3$ | 220.22 | 60 | 80 | 59.99 | 5.49 | 12.72 | 60.05 | 5.69 | 12.91 |
| 69261 | $C_2H_5-$ | $C_{12}H_{14}N_2O_3$ | 234.25 | 70 | 74 | 61.52 | 6.02 | 11.96 | 61.36 | 5.99 | 11.93 |
| 69260 | $C_3H_7(iso)-$ | $C_{13}H_{16}N_2O_3$ | 248.27 | 65 | 78 | 62.89 | 6.50 | 11.28 | 62.81 | 6.42 | 11.39 |
| 69259 | $CH_2=CH-CH_2-$ | $C_{13}H_{14}N_2O_3$ | 246.26 | 62 | 40 | 63.40 | 5.73 | 11.33 | 63.41 | 5.80 | 11.53 |
| 69256 | $C_4H_9(n)-$ | $C_{14}H_{18}N_2O_3$ | 262.30 | 70 | 60 | 64.10 | 6.92 | 10.68 | 64.22 | 4.96 | 10.73 |

TABLE II

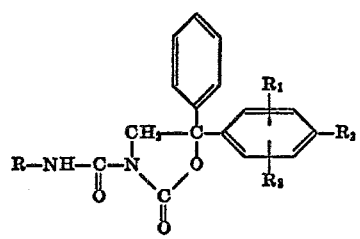

[R₁=R₂=R₃=H]

| Code number | R | Empirical formula | Molecular weight | Yield (percent) | Melting point (°C.) | Calculated C | Calculated H | Calculated N | Found C | Found H | Found N |
|---|---|---|---|---|---|---|---|---|---|---|---|
| 6986 | $C_6H_5-$ | $C_{22}H_{18}N_2O_3$ | 358.38 | 89 | 163 | 73.73 | 5.06 | 7.82 | 73.72 | 5.27 | 8.02 |
| 69286 | $C_2H_5-$ | $C_{18}H_{18}N_2O_3$ | 310.34 | 80 | 116 | 69.66 | 5.85 | 9.03 | 69.61 | 5.81 | 9.29 |
| 69264 | $C_3H_7(iso)-$ | $C_{19}H_{20}N_2O_3$ | 324.37 | 88 | 142 | 70.35 | 6.22 | 8.64 | 70.26 | 6.14 | 8.65 |
| 69265 | $CH_2=CH-CH_2-$ | $C_{19}H_{18}N_2O_3$ | 322.35 | 85 | 96 | 70.79 | 5.63 | 8.69 | 70.69 | 5.55 | 8.78 |
| 69277 | $C_4H_9(n)-$ | $C_{20}H_{22}N_2O_3$ | 338.39 | 82 | 110 | 70.98 | 6.55 | 8.28 | 71.19 | 6.55 | 8.53 |
| 69281 | $C_5H_{11}-$ | $C_{22}H_{24}N_2O_3$ | 364.43 | 78 | 178 | 72.50 | 6.64 | 7.69 | 72.45 | 6.80 | 7.79 |

TABLE III

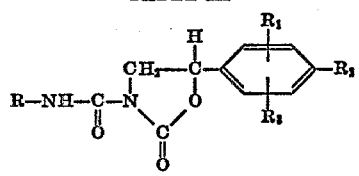

[R₃=H]

| Code number | R | R₁ | R₂ | Empirical formula | Molecular weight | Melting point (°C.) | Yield (percent) | Calculated C | Calculated H | Calculated N | Found C | Found H | Found N |
|---|---|---|---|---|---|---|---|---|---|---|---|---|---|
| 70276 | $C_2H_5$ | H | 4-$CH_3$ | $C_{13}H_{16}N_2O_3$ | 248.27 | 70 | 56 | 62.89 | 6.50 | 11.28 | 62.71 | 6.21 | 11.47 |
| 70271 | $C_3H_7(n)$ | H | 4-$CH_3$ | $C_{14}H_{18}N_2O_3$ | 262.30 | 50 | 69 | 64.10 | 6.92 | 10.68 | 64.25 | 6.96 | 10.80 |
| 70268 | $C_3H_7(iso)$ | H | 4-$CH_3$ | $C_{14}H_{18}N_2O_3$ | 262.30 | 60 | 69 | 64.10 | 6.92 | 10.68 | 64.29 | 6.94 | 10.58 |
| 70256 | $C_2H_5$ | H | 4-Cl | $C_{12}H_{13}ClN_2O_3$ | 268.70 | 80 | 76 | 53.64 | 4.88 | 10.43 | 53.69 | 4.86 | 10.41 |
| 70266 | $C_3H_7(n)$ | H | 4-Cl | $C_{13}H_{15}ClN_2O_3$ | 282.72 | 50 | 78 | 55.22 | 5.35 | 9.91 | 55.30 | 5.18 | 9.95 |
| 70267 | $C_3H_7(iso)$ | H | 4-Cl | $C_{13}H_{15}ClN_2O_3$ | 282.72 | 75 | 83 | 55.22 | 5.35 | 9.91 | 55.37 | 5.17 | 10.10 |
| 70237 | $C_2H_5$ | 3-Cl | 4-Cl | $C_{12}H_{12}Cl_2N_2O_3$ | 303.15 | 112 | 78 | 47.54 | 3.99 | 9.24 | 47.72 | 3.88 | 9.44 |
| 70252 | $C_3H_7(n)$ | 3-Cl | 4-Cl | $C_{13}H_{14}Cl_2N_2O_3$ | 317.17 | 72 | 50 | 49.24 | 4.45 | 8.83 | 49.44 | 4.43 | 8.98 |
| 70255 | $C_3H_7(iso)$ | 3-Cl | 4-Cl | $C_{13}H_{14}Cl_2N_2O_3$ | 317.17 | 82 | 66 | 49.24 | 4.45 | 8.83 | 49.21 | 4.49 | 9.02 |
| 70273 | $C_2H_5$ | H | 4-F | $C_{12}H_{13}FN_2O_3$ | 252.24 | 70 | 86 | 57.14 | 5.20 | 11.11 | 57.30 | 5.24 | 11.16 |
| 70274 | $C_3H_7(n)$ | H | 4-F | $C_{13}H_{15}FN_2O_3$ | 266.27 | 45 | 78 | 58.64 | 5.68 | 10.52 | 58.50 | 5.68 | 10.68 |
| 70279 | $C_3H_7(iso)$ | H | 4-F | $C_{13}H_{15}FN_2O_3$ | 266.27 | 45 | 64 | 58.64 | 5.68 | 10.52 | 58.50 | 5.87 | 10.71 |
| 70259 | $C_2H_5$ | 3-F | H | $C_{12}H_{13}FN_2O_3$ | 252.24 | 57 | 93 | 57.14 | 5.20 | 11.11 | 57.34 | 5.06 | 11.26 |
| 70277 | $C_3H_7(n)$ | 3-F | H | $C_{13}H_{15}FN_2O_3$ | 266.27 | 45 | 66 | 58.64 | 5.68 | 10.52 | 58.84 | 5.69 | 10.66 |
| 70275 | $C_3H_7(iso)$ | 3-F | H | $C_{13}H_{15}FN_2O_3$ | 266.27 | 50 | 79 | 58.64 | 5.68 | 10.52 | 58.80 | 5.66 | 10.65 |

The compounds of Formula I have been tested on animals in the laboratory and have shown to possess in particular anticonvulsivant, myorelaxant, antidepressive, antiinflammatory, anxiolytic and analgesic properties.

(I) Anticonvulsivant properties

The compounds of Formula I possess inhibiting properties, by oral means, on the mortality provoked in the mouse by the administration of convulsivant agents such as strychnine, cardiazol and nicotine. As well, they inhibit, by oral means, the tonic convulsions provoked by a supramaxinal electric shock on rats and mice.

By way of example, the results obtained with a certain number of compounds of Formula I are listed in the following Table IV:

TABLE IV

| Code number | Dose administered (mg./kg./PO) | Percentage protection against— |||||
|---|---|---|---|---|---|---|
| | | Nicotine | Strychnine | Cardiazol | Electric shock |  |
| | | | | | Rat | Mouse |
| 6913 | 75 | 78 | 100 | | | 50 |
| | 150 | | | 80 | | |
| 69255 | 150 | 90 | 100 | 80 | 80 | 60 |
| 69256 | 200 | 100 | 100 | 60 | | |
| 69259 | 50 | | | 90 | | |
| 69260 | 200 | 90 | 100 | 100 | 70 | 70 |
| 69261 | 150 | 65 | 100 | 80 | 100 | 80 |
| 69270 | 200 | | | 85 | 40 | |
| 70237 | 100 | | | | | 50 |
| 70252 | 100 | | | | | 70 |
| 70273 | 100 | | | 85 | | |
| 70274 | 100 | | | 50 | | |

(II) Myorelaxant properties

Such properties are shown by an incapacity to execute reestablishment movements on a horizontally suspended metallic bar (traction test), in the rats having received, by oral means, compounds of Formula I.

By way of example, the results obtained with a certain number of compounds of Formula I are listed in the following Table V:

TABLE V

| Code number | Dose administered (mg./kg./PO) | Percentage inhibition |
|---|---|---|
| 69255 | 300 | 90 |
| 69256 | 400 | 70 |
| 69259 | 100 | 100 |
| 69260 | 400 | 100 |
| 69261 | 300 | 90 |

(III) Antidepressive properties

The compounds of Formula I inhibit, by oral means, in rats, gastric ulcerations and ptosis and, in the mice, hypothemia and ptosis, produced by the administration of reserpine.

By way of example, the results obtained with a certain number of compounds of Formula I are listed in the following Table VI:

TABLE VI

| Code number | Dose administered, mg./kg./PO | Animal treated | Reduction of— |||
|---|---|---|---|---|---|
| | | | Gastric ulcerations, percent | Palpebral ptosis, percent | Hypothermia, percent |
| 6913 | 75 | Mouse | | | 4 |
| | 150 | Rat | 40 | 55 | |
| | | Mouse | | 40 | |
| 70259 | 100 | Rat | | 65 | |
| 70275 | 100 | Rat | | 40 | |
| 70277 | 100 | Rat | | 55 | |

As a result of the values shown above and those shown in the following Table VII, the difference between the pharmacologically active dose and the lethal dose is sufficiently great to permit the compounds of Formula I to be utilised in therapeutics.

(IV) Antiinflammatory properties

Such properties are shown by a diminution of the local oedema provoked by the under-planatary injection of a phlogogenic agent such as carraghenine, in rats, followed by the oral administration of the compound of Formula I.

By way of example, the results obtained with a certain number of compounds of Formula I are listed in the following Table VII:

TABLE VII

| Code number | Dose administered (mg./kg./PO) | Percentage inhibition |
|---|---|---|
| 69255 | 150 | 40 |
| 69260 | 200 | 35 |
| 69261 | 150 | 42 |
| 69265 | 200 | 45 |
| 70273 | 100 | 55 |
| 70274 | 100 | 60 |

(V) Anxiolytic properties

The compounds of Formula I possess augmentative properties, by oral means, of the number of performances of this mice subjected to a test with four plates.

The results obtained with a certain number of compounds of Formula I are listed in the following Table VIII, the dose administered being 100 mg./kg./PO.

TABLE VIII

| Code No. of compound tested: | Increase in No. of performances in test with four plates, percent |
|---|---|
| 70273 | 65 |
| 70274 | 100 |
| 70252 | 55 |

(VI) Analgesic properties

The compounds of Formula I administered by oral means in mice, are capable of reducing the number of consecutive painful stretchings produced by the intraperitoneal injection of phenylbenzoquinone.

By way of example, the diminution of the painful stretchings produced by the administration of 100 mg./kg./PO of compound Nos. 70256 and 70267 is 40% and 45% respectively.

As a result of the values shown above and those shown in the following Table IX, the difference between the pharmacologically active dose and the lethal dose is sufficiently great to permit the compounds of Formula I to be utilised in therapeutics.

TABLE IX

| Code No. of compound tested: | Toxicity approaching $LD_{50}$ (mouse) (in mg./kg./PO) |
|---|---|
| 6913 | 1300 |
| 69255 | 1650 |
| 69256 | 2200 |
| 69259 | 850 |
| 69260 | 2000 |
| 69261 | 1500 |
| 69265 | >4000 |
| 69270 | 2300 |
| 70259 | 2000 |
| 70277 | 1900 |
| 70275 | 2100 |
| 70273 | 1300 |
| 70274 | 2400 |
| 70256 | 2000 |
| 70267 | 2600 |
| 70237 | 2500 |
| 70252 | >2000 |

The compounds of Formula I are useful in the treatment of depressions, anxiety, epilepsy and painful contractions and inflammations.

They are administered by oral means in the form of tablets, sugar-coated pills and gelules containing 50 to 400 mg. of active ingredient (1 to 6 times per day) and by rectal means in the form of suppositories containing 50 to 300 mg. of active ingredient (1 or 2 times per day).

What we claim is:
1. A compound of the formula

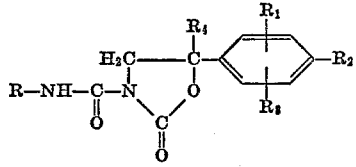

wherein
$R_4$ is hydrogen or phenyl,
R is phenyl or cyclohexyl, and
$R_1$, $R_2$ and $R_3$ are hydrogen, methyl or halogen.
2. A compound according to claim 1, in which R is cyclohexyl.
3. A compound acording to claim 1, in which R is phenyl.

References Cited
FOREIGN PATENTS
277,277  12/1969  Austria.

OTHER REFERENCES
Close, J. Am. Chem. Soc. 73, 95–98 (1951).

ALEX MAZEL, Primary Examiner
R. V. RUSH, Assistant Examiner

U.S. Cl. X.R.
424—272